United States Patent
Mochizuki et al.

(10) Patent No.: US 7,420,729 B2
(45) Date of Patent: Sep. 2, 2008

(54) SMALL THIN FILM MOVABLE ELEMENT, SMALL THIN FILM MOVABLE ELEMENT ARRAY AND METHOD OF DRIVING SMALL THIN FILM MOVABLE ELEMENT

(75) Inventors: Fumihiko Mochizuki, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 59 days.

(21) Appl. No.: 11/482,737

(22) Filed: Jul. 10, 2006

(65) Prior Publication Data
US 2007/0008674 A1    Jan. 11, 2007

(30) Foreign Application Priority Data
Jul. 8, 2005    (JP) ............................. P2005-200368

(51) Int. Cl.
*G02B 26/00*    (2006.01)
(52) U.S. Cl. ........................ 359/290; 359/212; 359/223
(58) Field of Classification Search ................ 359/290, 359/291, 292, 295, 298, 220, 223, 224; 310/309, 310/311, 328
See application file for complete search history.

(56) References Cited

U.S. PATENT DOCUMENTS

| | | | | |
|---|---|---|---|---|
| 4,507,705 | A * | 3/1985 | Hoshino et al. | 361/283.1 |
| 6,949,866 | B2 * | 9/2005 | Miller et al. | 310/311 |
| 7,141,915 | B2 * | 11/2006 | Takeuchi et al. | 310/328 |
| 7,215,061 | B2 * | 5/2007 | Kihara et al. | 310/309 |
| 7,220,009 | B2 * | 5/2007 | Shimada et al. | 359/849 |

FOREIGN PATENT DOCUMENTS

| JP | 8-334709 A | 12/1996 |
|---|---|---|
| JP | 10-510374 A | 10/1998 |

\* cited by examiner

*Primary Examiner*—Ricky L Mack
*Assistant Examiner*—Tuyen Q Tra
(74) *Attorney, Agent, or Firm*—Sughrue Mion, PLLC

(57) ABSTRACT

A small thin film movable element comprises: a movable portion supported elastically deformably and having a movable electrode at least a portion of the movable portion; and a fixed electrode arranged to be opposed to the movable portion, wherein the movable portion is displaced by an electrostatic force in accordance with a voltage applied to the movable electrode and the fixed electrode, and wherein the movable portion comprises a vibration applying unit that applies a vibration to the movable portion at least immediately before displacing operation of the movable portion.

11 Claims, 16 Drawing Sheets

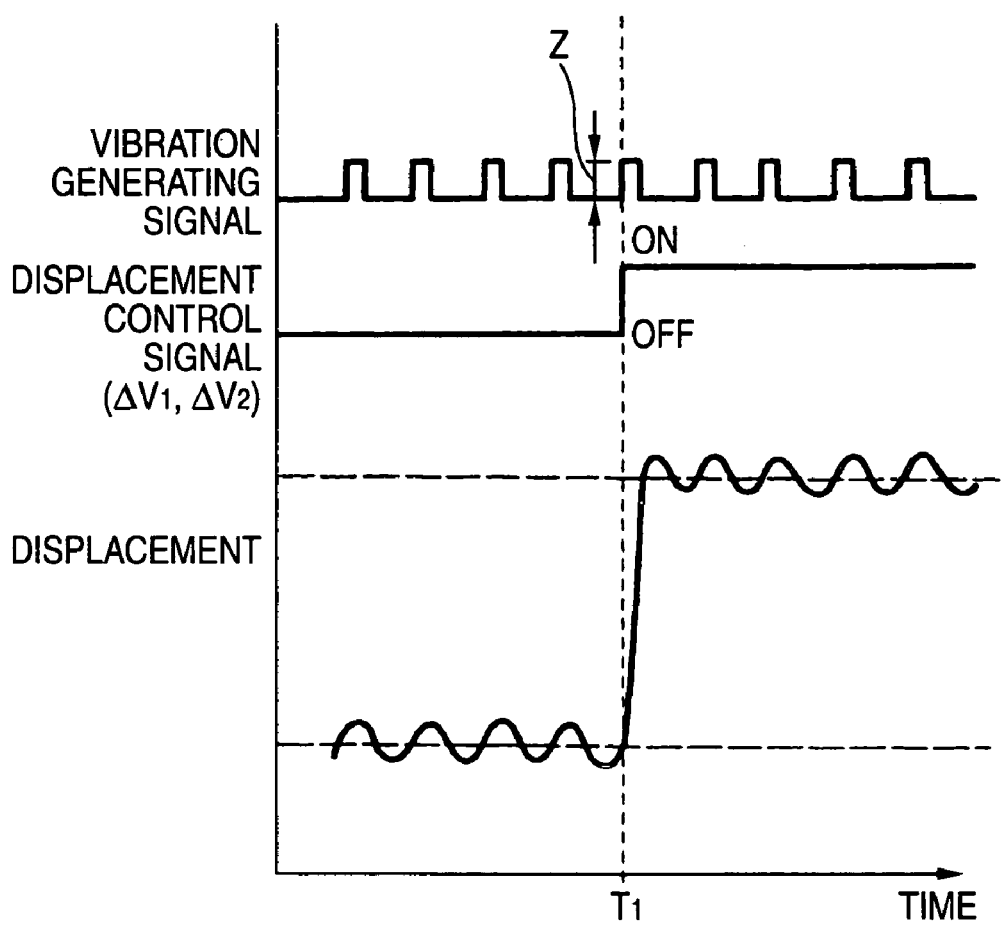

A-A SECTION

D-D SECTION

D-D SECTION

E-E SECTION

E-E SECTION

SMALL THIN FILM MOVABLE ELEMENT, SMALL THIN FILM MOVABLE ELEMENT ARRAY AND METHOD OF DRIVING SMALL THIN FILM MOVABLE ELEMENT

BACKGROUND OF THE INVENTION

1. Field of the Invention

The present invention relates to a small thin film movable element and a small thin film movable element array as well as a method of driving a small thin film movable element for displacing a movable portion by an electrostatic force in accordance with a voltage applied to a movable electrode and a fixed electrode.

2. Description of the Related Art

In recent tears, by rapid progress of an MEMS technology (MEMS; Micro-Electro Mechanical Systems), there has been intensively carried out a development of a small thin film movable element for electrically displacing/moving a small thin film of μm order (refer to, for example, JP-T-10-510374 and JP-A-8-334709). As the small thin film movable element, there are, for example, a digital micromirror device (DMD) for deflecting light by inclining a micromirror, an optical switch for switching an optical path, an RF switch for connecting and switching an RF (high frequency) signal and the like. In a field of an optical information processing, DMD is provided with a wide use of a projecting display, a video monitor, a graphic monitor, a television set and electrophotography printing and the like. Further, application of an optical switch is expected in optical communication, optical interconnection (a signal connection technology by light such as an intercoupling network by parallel computers), an optical information processing (information processing by optical operation) and the like.

A small thin film movable element generally includes a movable portion which is supported elastically displaceably and is displaced bi-directionally, and the movable portion mainly deals with switching operation. Therefore, a control of braking a movable portion becomes particularly important in carrying out excellent switching operation.

In the related art, in a control of braking a movable portion of a small thin film movable element of this kind, it is general to start to displace a movable portion to a desired fixed electrode from a stationary state of the movable portion (a state in which the movable portion is not vibrated). That is, for example, according to a small thin film movable element in which a movable portion is pivoted centering on a hinge, when a drive voltage is applied to a movable electrode provided at the movable portion and a fixed electrode provided at a board, an electrostatic force is operated to the movable portion and the fixed electrode, and the movable portion is attracted to the board against a gravitational force, an elastic force of the hinge. A state in which the movable portion is pivoted to displace by the electrostatic force and a pivoting front end is adsorbed (pulled) to the board is referred to as (Pull-in).

In a case of a small thin film movable element, generally, when a drive voltage is made ON from an OFF state, as shown by FIG. 19A, there is brought about a transition period of a movable portion until the movable portion is completely pulled in. That is, a delay is produced until the movable portion is operated to be ON substantially from ON of the drive voltage. The delay is produced similarly even in a case of making the drive voltage OFF from an ON state as shown by FIG. 19B.

Under such a situation, when a small thin film movable element is used in, for example, an exposing apparatus, according to the exposing apparatus, the movable portion is operated to be ON substantially when the drive voltage to the small thin film movable element is made ON and thereafter operated and therefore, by a difference in timings when the movable portion is made OFF from ON and made ON from OFF, a difference in an optical amount is brought about to pose a problem that an amount of exposing a photosensitive member is varied.

SUMMARY OF THE INVENTION

The invention has been carried out in view of the above-described situation and it is an object thereof to provide a small thin film movable element and a small thin film movable element array as well as a method of driving a small thin film movable element capable of reducing a difference in timings when a movable portion is made OFF from ON and made ON from OFF and promoting a speed and an accuracy of various application operation utilizing a displacement of the movable portion by a low voltage.

The above-described object according to the invention is achieved by constitutions shown below.

(1) A small thin film movable element comprising: a movable portion supported elastically deformably and having a movable electrode at least a portion of the movable portion; and a fixed electrode arranged to be opposed to the movable portion, wherein the movable portion is displaced by an electrostatic force in accordance with a voltage applied to the movable electrode and the fixed electrode, and wherein the movable portion comprises a vibration applying unit that applies a vibration to the movable portion at least immediately before displacing operation of the movable portion.

According to the small thin film movable element, the movable portion is vibrated at least immediately before the displacing operation and a vibration component in a displacing direction is utilized as an inertia force for displacing the movable portion. Therefore, the electrostatic force for operating to start the displacement become small and applied in a short period of time in comparison with an element of the related art for displacing the movable portion from a stationary state. Further, by the vibration, the movable portion moved in the displacing direction is started to be displaced and therefore, also an amount of displacing the movable portion becomes small.

(2) The small thin film movable element according to (1) wherein the vibration applying unit applies a displacement control signal for displacing the movable portion to the fixed electrode between the movable electrode and the fixed electrode when the movable portion is moved to the fixed electrode by the vibration.

According to the small thin film movable element, when the movable portion is moved to the fixed electrode, the vibration component is operated as the inertia force for displacing the movable portion. Therefore, the vibration component is effectively utilized efficiently as an assisting force for displacing the movable portion.

(3) The small thin film movable element according to (2) wherein the displacement control signal is applied when a distance between the movable portion and the fixed electrode becomes the shortest.

According to the small thin film movable element, by vibrating the movable portion, the movable portion is repeated to be moved to be proximate to and remote from the fixed electrode, and in a period of the movement, the displacement control signal is applied when the movable portion is proximate to the fixed electrode the most. Thereby, the vibration component is efficiently operated, and the displacement control signal for assisting the movable portion, that is, the displacement control signal can be applied minimally and in a short period of time.

(4) The small thin film movable element according to (1), further comprising a board to which the fixed electrode is provided, wherein the movable electrode is provided to the movable portion of a thin film shape, the movable portion being supported by the board to be spaced apart from each other by a gap there between, and the movable portion is moved to be proximate to and remote from the board substantially in parallel with the board.

According to the small thin film movable element, an element of a so-to-speak parallel flat plate type is constituted by the movable portion and the board, when the voltage is applied to the movable electrode and the fixed electrode, the movable portion is moved in a direction in which the movable portion is proximate to the board in parallel therewith by the electrostatic force and is brought into contact with the board at a finally displaced position. At this occasion, the vibration component is utilized as the inertia force for displacing the movable portion and the movable portion can be displaced by a low voltage and at high speed.

(5) The small thin film movable element according to (1) further comprising a board to which the fixed electrode is provided, wherein the movable electrode is provided to the movable portion of a thin film shape, the movable portion being supported by the board to be spaced apart from each other by a gap there between and supported by the board by way of a support portion, and the movable portion is pivoted centering on the support portion.

According to the small thin film movable element, a pair of the fixed electrodes centering on the support portion are provided at an upper face of the board and the movable electrode is provided at the movable portion. When the voltage is applied to the pair of fixed electrodes and the movable electrode, the movable portion is pivoted to displace centering on the support portion by the electrostatic force and is brought into contact with the board at the finally displaced position. At this occasion, the vibration component is utilized as the inertia force for rotating the movable portion and the movable portion can be rotated by a low voltage and at high speed.

(6) The small thin film movable element according to any one of (1) through (5), wherein the movable portion further comprises a reflecting face, and light incident on the reflecting face of the movable portion is modulated.

According to the small thin film movable element, when the voltage is applied to the fixed electrode and the movable portion, the movable portion is pivoted to displace, and a direction of reflecting light incident on the reflecting face of the movable portion is deflected. At this occasion, the vibration component is utilized as an inertia force for rotating the movable portion, the movable portion can be displaced by a low voltage and at high speed, as a result, light can be modulated at high speed.

(7) The small thin film movable element according to any one of (1) through (5), further comprising a board to which the fixed electrode is provided, the board comprising an input terminal and an output terminal, wherein the movable portion further comprises a shortcircuit contact, and the shortcircuit contact of the movable portion opens and closes the input terminal and the output terminal to connect and switch a high frequency signal.

According to the small thin film movable element, when the voltage is applied to the movable electrode and the fixed electrode, the movable portion is displaced by the electrostatic force, the shortcircuit contact of the movable portion is simultaneously brought into contact with the input terminal and the output terminal at the finally displaced position, and the input terminal and the output terminal are closed. At this occasion, the vibration component is utilized as the inertia force for rotating the movable portion, the movable portion can be displaced by a low voltage and at high speed, as a result, an RF (high frequency) signal can be connected at high speed and can be switched at high speed.

(8) The small thin film movable element according to any one of (1) through (7), wherein the vibration applied to the movable portion by the vibration applying unit is a vibration having a resonance frequency.

According to the small thin film movable element, since the vibration applied to the movable portion is the vibration having the resonance frequency, the movable portion can be controlled to be vibrated once to maintain the vibration thereafter, and the vibration generating signal for maintaining to vibrate the movable portion, that is, vibration control energy can be saved.

(9) A small thin film movable element array comprising small thin film movable elements which are one-dimensionally or two-dimensionally aligned, each of the small thin film movable elements being according to the small thin film movable element according to any one of (1) though (8).

According to the small thin film movable element array, the individual small thin film movable elements can be operated by the necessary minimum electrostatic force and at high speed, and a total of the array can be operated at high speed. Further, although high accuracy is requested for an optical switch array for optical communication and therefore, an operational error caused by a variation in the individual elements needs to be corrected, according to the small thin film movable element array, the displacement control signal of the individual small thin film movable elements can be changed in correspondence with the correction.

(10) A method of driving the small thin film movable element according to (8), the method comprising intermittently applying to the movable portion a vibration generating signal for generating the vibration having the resonance frequency.

According to the method of driving a small thin film movable element, by vibrating the movable portion by the resonance frequency and intermittently applying the vibration generating signal for generating the vibration, in comparison with a case of applying the vibration generating signal always, the vibration generating signal for maintaining to vibrate the movable portion, that is, the vibration control energy can be restrained.

BRIEF DESCRIPTION OF THE DRAWINGS

FIG. 2 is a timing chart showing a relationship between a vibration generating signal and a displacement;

FIGS. 5A and 5B illustrate conceptual views showing a second embodiment of a small thin film movable element according to the invention, in which FIG. 5A is a sectional view of the element, and FIG. 5B is a sectional view taken along a line A-A of FIG. 5A;

DETAILED DESCRIPTION OF THE INVENTION

An explanation will be given of preferable embodiments of a small thin film movable element and a small thin film movable element array as well as a method of driving a small thin film movable element according to the invention in reference to the drawings as follows.

Figure 1A:
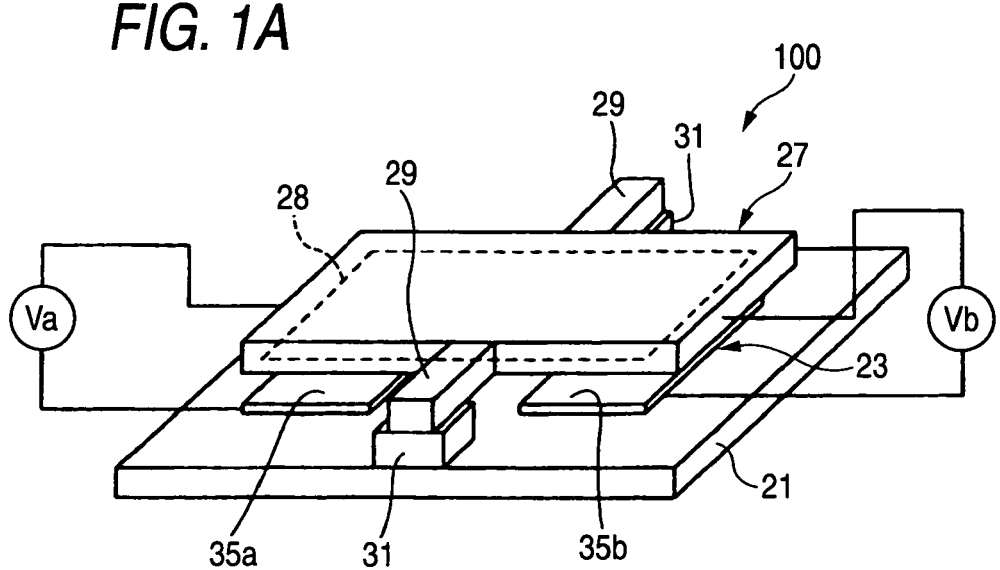
FIGS. 1A and 1B illustrate conceptual views showing a first embodiment of a small thin film movable element according to the invention.
Figure 1B:
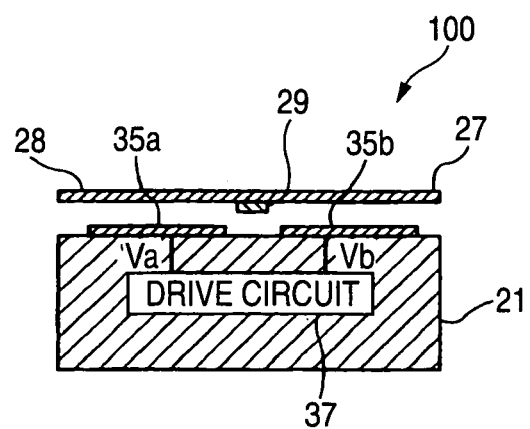

FIGS. 1A and 1B illustrates conceptual views showing a first embodiment of a small thin film movable element.

A small thin film movable element 100 according to the embodiment includes a board 21, a movable portion 27 in a shape of a small piece arranged in parallel with the board 21 by way of a gap 23, hinges 29, 29 constituting support portions extended from both edge portions of the movable portion 27, and spacers 31, 31 for supporting the movable portion 27 by the board 21 by way of the hinges 29, 29 as basic constituent elements. By such a constitution, the movable portion 27 is made to be able to be rotated to displace by twisting the hinges 29, 29.

According to the small thin film movable element 100, an upper face of the movable portion 27 constitutes a light reflecting portion (micromirror portion). Otherwise, the small thin film movable element according to the invention can also switch a sound wave, a fluid, a heat ray, or switch an RF signal by pertinently selecting a material of the movable portion 27, or attaching a shortcircuit contact or the like.

According to the embodiment, the movable portion 27 is brought into contact with the board 21 or a stationary member, not illustrated, to stop in reaching a final position of displacement in a specific direction. That is, the small thin film movable element of a contact type is constituted.

An upper face of the board 21 is provided with a first address electrode 35a and a second address electrode 35b constituting fixed electrodes on both sides thereof centering on the hinges 29, 29. Further, also the movable portion 27 is provided with a movable electrode 28 at a portion thereof. The small thin film movable element 100 is provided with a drive circuit 37 including a vibration applying unit details of which will be described later at inside of the board 21, and the drive circuit 37 applies a voltage between the movable portion 27 and the first address electrode 35a and between the movable portion 27 and the second address electrode 35b. The small thin film movable element 100 pivots to displace the movable portion 27 by constituting centers of twist by the hinges 29, 29 by applying a voltage to the first address electrode 35a, the second address electrode 35b, the movable portion 27 as basic operation. That is, since the movable portion 27 constitutes a micromirror portion, a direction of reflecting light is switched.

According to the small thin film movable element 100, when a potential difference is applied to the first address electrode 35a, the second address electrode 35b relative to the movable portion 27, electrostatic forces are generated between the respective electrodes and the movable portion 27 and a rotational torque is operated centering on the hinges 29, 29. The electrostatic force generated at this occasion depends on a space permittivity, an area of the movable portion 27, an applied voltage, and an interval between the movable portion 27 and the address electrode.

Therefore, when the space permittivity, the area of the movable portion 27, the interval between the movable portion 27 and the address electrode, and an elastic coefficient of the hinges 29, 29 are constant, the movable portion 27 can be rotated to displace in a left and right direction by controlling potentials of the respective electrodes. For example, when Va>Vb, the electrostatic force generated between the first address electrode 35a and the movable portion 27 becomes larger than the electrostatic force generated between the second address electrode 35b and the movable portion 27 and the movable portion 27 is inclined to a left side. Conversely, when Va<Vb, the electrostatic force generated between the second address electrode 35b and the movable portion 27 becomes larger than the electrostatic force generated between the first address electrode 35a and the movable portion 27 and the movable portion 27 is inclined to a right side.

In this way, the movable electrode of the movable portion 27, the first address electrode 35a, the second address electrode 35b constitute a drive source for rotating to displace the movable portion 27. By constituting a physical operating force applied from the drive source to the movable portion 27 by the electrostatic force, rotational displacement at high speed can be carried out.

Further, the physical operating force operated to the movable portion 27 may be a physical operating force other than the electrostatic force. As other physical operating force, for example, a piezoelectric effect or an electromagnetic force can be pointed out. In this case, as the drive source, a piezoelectric actuator using a piezoelectric element, an electromagnetic actuator using a magnet and a coil is adopted.

In this way, the small thin film movable element 100 includes the movable portion 27 displaced bi-directionally and the movable portion 27 is provided with a switching function. The movable portion 27 is rotated to displace by a plurality of drive sources (the movable electrode 28 of the movable portion 27, the first address electrode 35a, the second address electrode 35b) for applying the physical operating force. The small thin film movable element 100 according to the embodiment is operated with the electrostatic force as the physical operating force. The electrostatic force pulls the movable portion 27 to the side of the board 21 against the gravitational force, the elastic force of the hinges 29, 29. A state of adsorbing (pulling) a pivoting front end to the board 21 by pivoting to displace the movable portion 27 by the electrostatic force in this way is referred to as "pull-in". That is, the movable portion 27 is displaced by the electrostatic force generated by reaching a pull-in voltage by a displacement control signal applied to the movable electrode 28, the first address electrode 35a, the second address electrode 35b.

The displacement control signal is referred to as an analog control region before reaching the pulling voltage and cannot be controlled by binary values. That is, the displacement control signal constitutes a region in which a stepless analog control can be carried out.

Meanwhile, the small thin film movable element 100 according to the embodiment is constructed by a constitution in which the movable portion 27 is applied with a vibration at least immediately before a displacement by the vibration applying unit. The movable portion 27 may be vibrated incessantly. The vibration is carried out in the analog control region before reaching the pull-in voltage. Further, although a frequency of the vibration can be made to be arbitrary, preferably, as described later, the frequency of the vibration may be a resonance frequency of the movable portion 27.

FIG. 2 is a timing chart showing a relationship between a vibration generating signal and a displacement.

The vibration generating signal can be superposed on a displacement control signal applied for driving to displace the movable portion 27. Therefore, although when the displacement control signal is made OFF, the movable portion 27 is not displaced but is brought into a balanced state, the movable portion 27 is finely displaced by the vibration by the vibration generating signal. Further, the displacement at this occasion is made to fall, for example, in a range in which an influence is not effected on optical modulating operation of the micromirror portion. At Tl, when the displacement control signal is made ON, the movable portion 27 is displaced. At this occasion, a displacement control signal Vb is applied when the movable portion 27 is moved to the fixed electrode (the first address electrode 35a or the second address electrode 35b) by the vibration. Therefore, a vibration component Z is operated as an inertia force for displacing the movable portion 27. That is, the vibration component Z is effectively utilized efficiently as an assisting force for displacing the movable portion 27. Further, the movable portion 27 can be driven to displace by only applying the electrostatic force exceeding the analog region (operated by external force+inertia force) and therefore, low voltage formation can also be realized.

Further, it is preferable that the displacement control signal is applied when a distance between the movable portion 27 and the fixed electrode becomes the shortest. The movable portion 27 repeats to be moved to be proximate to and remote from the fixed electrode by being vibrated. In a period of the movement, when the movable portion 27 is proximate to the fixed electrode the most, the displacement control signal is applied. Thereby, the vibration component is operated efficiently. That is, the displacement control signal, that is, a displacement control voltage for assisting the movable portion 27 can be applied minimally and in a short period of time.

FIGS. 3A to 3D illustrates explanatory views of operation of the small thin film movable element of a rotating type applied with the vibration generating signal.

Figure 3A:
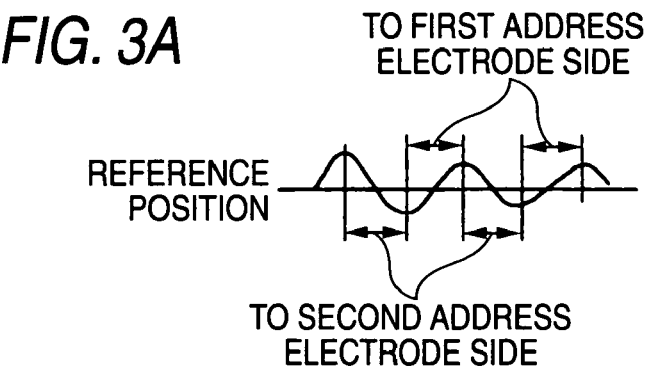
FIGS. 3A to 3D illustrate explanatory views showing operation of the small thin film movable element of a rotating type applied with the vibration generating signal.
Figure 3B:
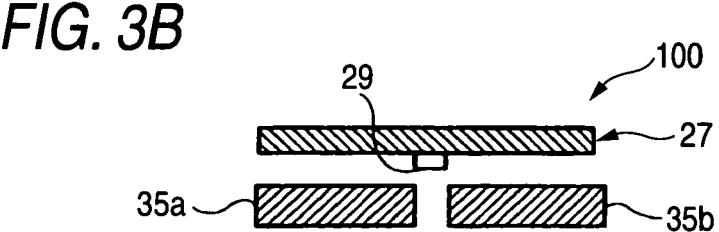
Figure 3C:
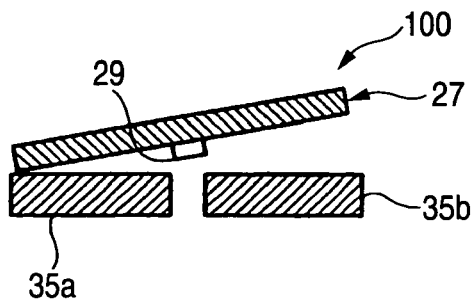

As shown by FIG. 3A, at the small thin film movable element 100, a small vibration is generated at the movable portion 27. That is, as shown by FIG. 3B, the movable portion 27 is finely vibrated while maintaining a balance in a state of making the displacement control signal OFF. Here, when the displacement control signal is applied to the first address electrode 35a and the movable portion 27 (movable electrode 28) in a period of time in which the movable portion 27 is displaced to a side of the first address electrode 35a, as shown by FIG. 3C, the electrostatic force generated between the first address electrode 35a and the movable portion 27 becomes larger than the electrostatic force generated between the second address electrode 35b and the movable portion 27 and the movable portion 27 is inclined to the left side.

Figure 3D:
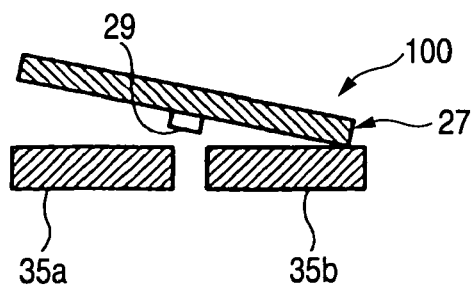

Conversely, when the displacement control signal Vb is applied to the second address electrode 35b and the movable electrode 28 in a period of time in which the movable portion 17 is displaced to the side of the second address electrode 35b, as shown by FIG. 3D, the electrostatic force generated between the second address electrode 35b and the movable portion 27 becomes larger than the electrostatic force generated between the first address electrode 35a and the movable portion 27 and the movable portion 27 is inclined to the right side. In either of the cases, the vibration component Z is utilized as the inertia force for rotating the movable portion 27, the force of driving the movable portion 27 is reduced and the movable portion 27 can be rotated by a low voltage and at high speed.

Further, although FIGS. 3A to 3D shows a case of pivoting the movable portion 27 in two left and right directions, even when there is constructed a constitution in which the hinge 29 is provided at one end of the movable portion 27 and the small thin film movable element is pivoted only to one end side, the vibration component Z is utilized as the inertia force for rotating the movable portion 27 and the movable portion 27 can be rotated by a low voltage and at high speed.

Although in the small thin film movable element 100, the movable portion 27 is vibrated by an arbitrary frequency in this way, it is preferable that the frequency is a resonance frequency of the movable portion 27. Further, at this occasion, it is further preferable that the vibration generating signal for generating vibration is intermittently applied. That is, by vibrating the movable portion 27 by the resonance frequency and intermittently applying the vibration generating signal for generating the vibration, in comparison with the case of always applying the vibration generating signal, the vibration generating signal for maintaining to vibrate the movable portion 27, that is, vibration control energy can be saved. In other words, there can be constituted a control of vibrating one end of the movable portion 27 and thereafter maintaining the vibration. In a case of, for example, DMD, such a control can be realized by controlling an amount of vibration by monitoring a modulated light amount, controlling an amount of vibration by detecting a displacement amount, or controlling a vibrating amount by detecting a change in an electrostatic capacitance.

Therefore, according to the small thin film movable element 100, the movable portion 27 is vibrated at least immediately before the displacing operation, and the vibration component Z in the displacing direction is utilized as the inertia force for displacing the movable portion 27. Therefore, the electrostatic force for operating to start to displace the small thin film movable element 100 becomes small and is operated by a short period of time in comparison with the element of the related art for displacing the movable portion 27 from the stationary state. Further, by reducing the difference in the timings when the movable portion 27 is made to be OFF from ON and made to be ON from OFF, speeds and accuracies of various application operations utilizing the displacement of the movable portion can be promoted.

Further, in the small thin film movable element 100 having the above-described constitution, it is preferable that an inner stress of the hinges 29, 29 is high. That is, when the inner stress is high, the resonance frequency becomes high, and when the resonance frequency is high, the timing for driving the small thin film movable element 100 can be constituted to be finer to achieve an advantage of facilitating the control.

Figure 4:
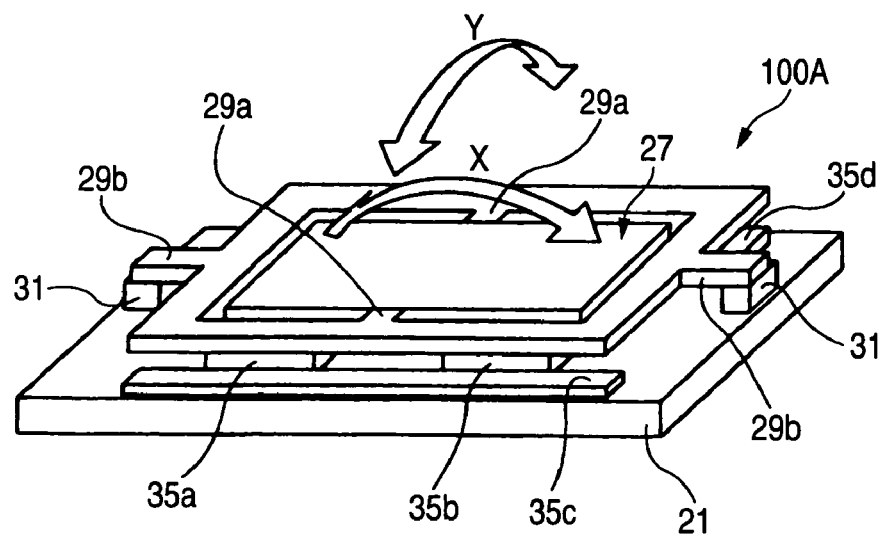
FIG. 4 is a perspective view showing an example of a three-dimensional small thin film movable element having a movable portion pivoted biaxially.

FIG. 4 is a perspective view showing an example of a three-dimensional small thin film movable element including a movable portion pivoted biaxially.

The small thin film movable element 100 may be a biaxial three-dimensional small thin film movable element 100A constituting centers of twist by hinges 29a, 29a, hinges 29b, 29b shown in FIG. 4 other than the monoaxial two-dimensional small thin film movable element constituting the basic constitution by constituting the center of twist by the hinges 29, 29 shown in FIGS. 1A and 1B. In this case, the three-dimensional small thin film movable element 100A is provided with a third address electrode 35c and a fourth address electrode 35d in addition to the first address electrode 35a and the second address electrode 35b. Further, the movable portion 27 is driven in X direction by applying the voltage to the first address electrode 35a, the second address electrode 35b, and the movable portion 27, and driven in Y direction by applying the voltage to the third address electrode 35c, the fourth address electrode 35d, and the movable portion 27.

Even in the case of the three-dimensional small thin film movable element 100A, a necessary minimum electrostatic force can be operated to the movable portion 27, and the vibration generated in pull-in time can be reduced while making a structure stay to be the structure of the related art. As a result, the small thin film movable element 100A can be operated by a low voltage and at high speed.

Next, an explanation will be given of a second embodiment of a small thin film movable element according to the embodiment.

Figure 5A:
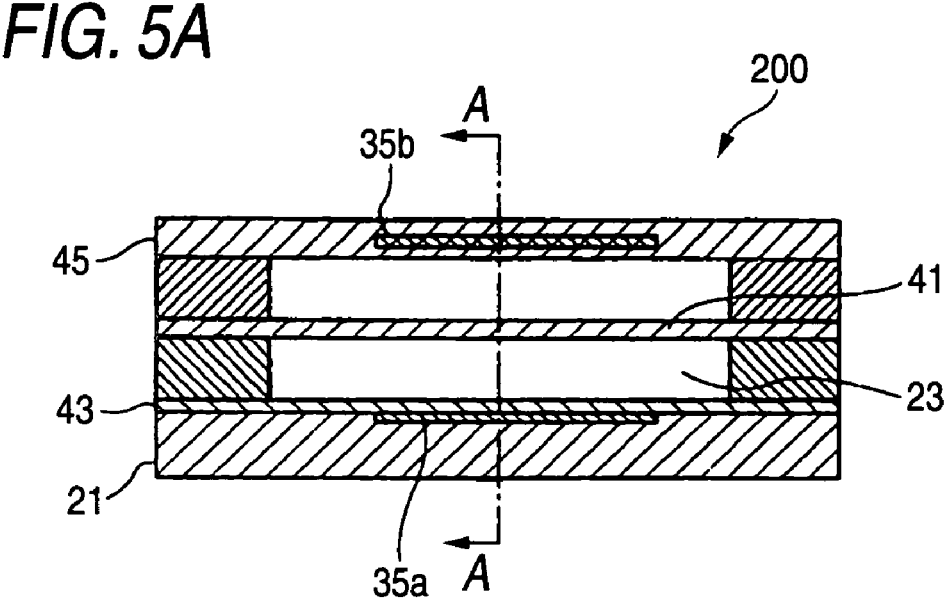
Figure 5B:
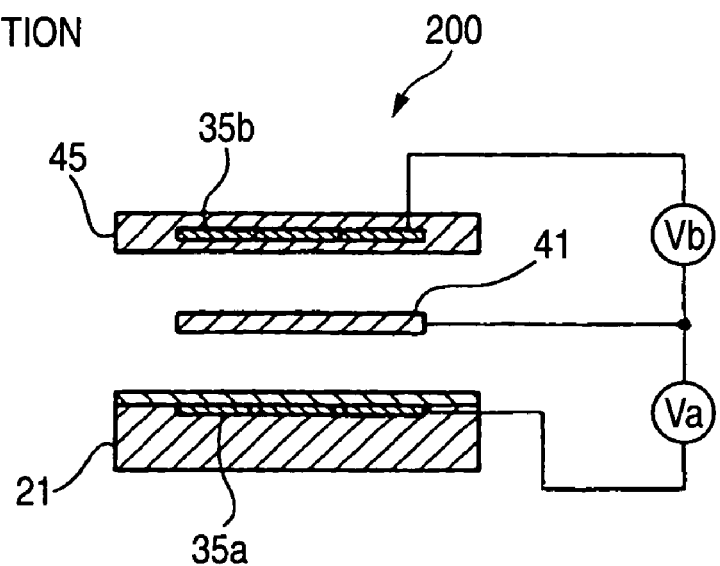

FIGS. 5A and 5B illustrate conceptual views showing the second embodiment of the small thin film movable element according to the invention.

The small thin film movable element 200 according to the embodiment is constituted by an element of so-to-speak a parallel flat plate type, and both ends of a movable portion 41 in a flat plate shape having a flexibility and a conductivity is fixed to an insulating film 43 formed on the board 21 by way of the predetermined gap 23. A lower side of the movable portion 41 of the board 21 is arranged with the first address electrode 35a by way of the insulating film 43, further, an upper side of the movable portion 41 is arranged with the second address electrode 35b by way of an insulating film 45. That is, the movable portion 41 is constituted by a shape of a both supporting beam both ends of which are supported between the first address electrode 35a and the second address electrode 35b.

Figure 6A:
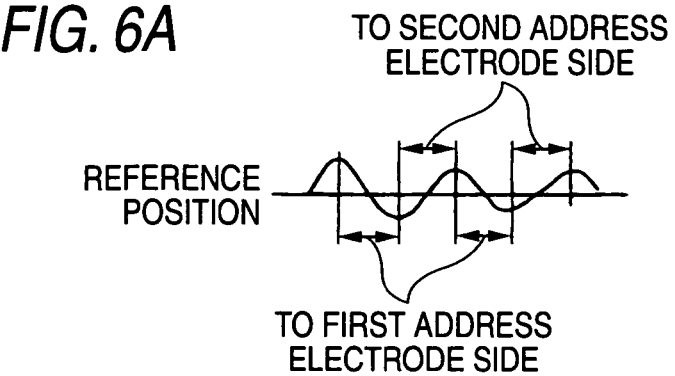
FIGS. 6A to 6D illustrate explanatory views of operation of a parallel flat plate type element according to the second embodiment.
Figure 6B:
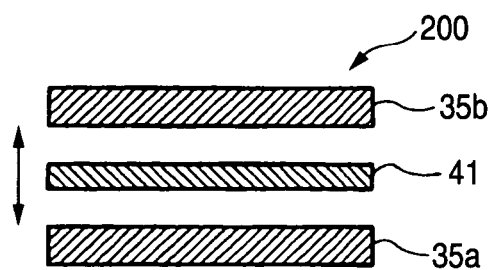
Figure 6C:
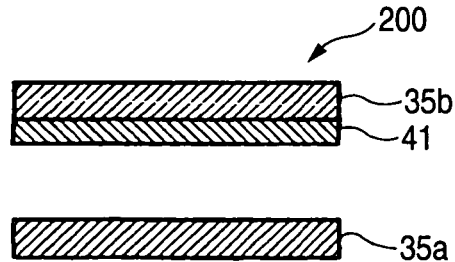
Figure 6D:
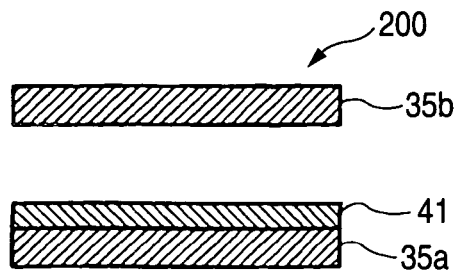
Figure 7A:
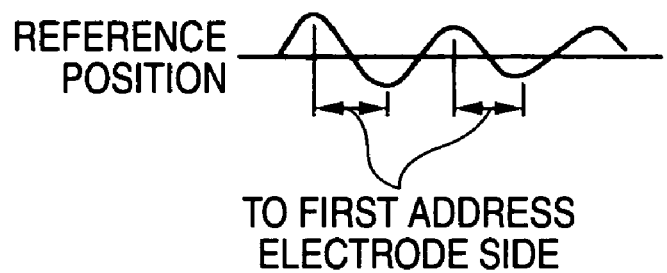
FIGS. 7A to 7C illustrate explanatory views of operation of a modified example of the second embodiment.
Figure 7B:
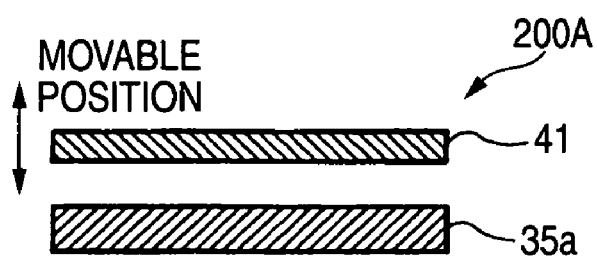
Figure 7C:

FIGS. 6A to 6D illustrates explanatory views of operation of the parallel flat plate type element according to the second embodiment, and FIGS. 7A to 7C illustrates explanatory views of operation of a modified example of the second embodiment.

Also in the small thin film movable element 200 of the parallel flat plate type, as shown by FIG. 6A, a small vibration is generated at the movable portion 41 by applying the vibration generating signal. That is, as shown by FIG. 6B, the movable portion 41 is finely vibrated while maintaining a balance in an OFF state of the displacement control signal.

By superposing the vibration generating signal on the voltage Va, Vb applied between the first address electrode 35a and the movable portion 41, or between the second address electrode 35b and the movable portion 41, the vibration component Z is operated as the inertia force for displacing the movable portion 41. That is, by applying the displacement control signal when the movable portion 41 is moved to the second address electrode 35b by vibration, as shown by FIG. 6 C, the movable portion 41 is pulled in to the side of the second address electrode 35b. Further, by applying the displacement control signal when the movable portion 41 is moved to the first address electrode 35a by vibration, as shown by FIG. 6D, the movable portion 41 is pulled in to the side of the first address electrode 35a. Therefore, the vibration component Z is effectively utilized efficiently as the assisting force for displacing the movable portion 41. Further, the movable portion 41 can be driven to displace by only applying the electrostatic force exceeding the analog region (by operating by external force+inertia force). Therefore, the small thin film movable element 200 can be operated by a low voltage at high speed.

Further, as shown by FIGS. 7A through 7C, a small thin film movable element 200A of a parallel flat plate type may be constructed by a constitution of arranging only the first address electrode 35a on a lower side of the movable portion 41 above the board by way of the insulating film 43. Also by the parallel flat plate type small thin film movable element 200A in an end direction, the vibration component Z is effectively utilized efficiently as the assisting force for displacing the movable portion 41 and can be operated in the end direction by low voltage at high speed.

FIGS. 8A to 8D illustrate explanatory views showing a third embodiment of a small thin film movable element according to the invention.

Figure 8A:
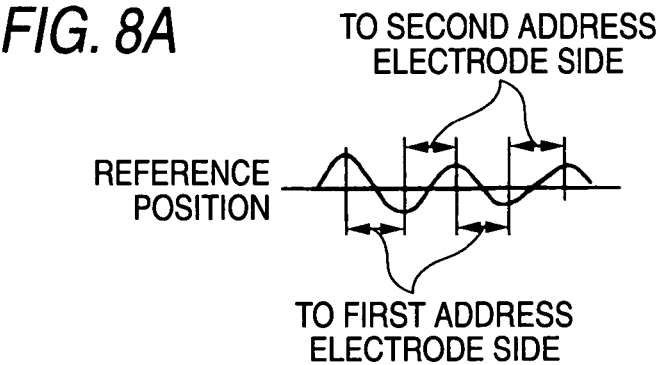
FIGS. 8A to 8D illustrate explanatory views showing a constitution and operation of a third embodiment of a small thin film movable element according to the invention.
Figure 8B:
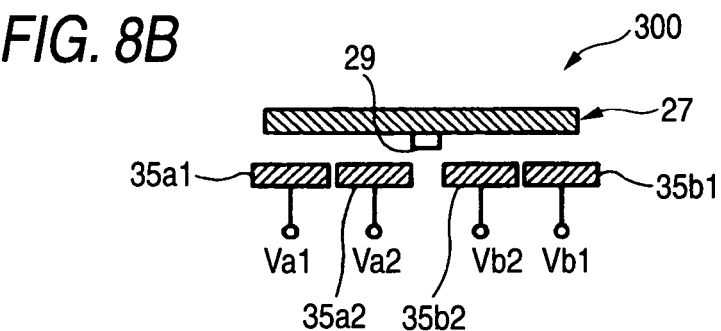

As shown by FIG. 8A, a small thin film movable element 300 according to the embodiment generates a small vibration at the movable portion 27 by applying the vibration generating signal. That is, as shown by FIG. 8B, the movable portion 27 is finely vibrated while maintaining a balance in an OFF state of the displacement control signal.

Further, the small thin film movable element 300 is constituted to be able to set two or more physical operating forces in respective transition directions of the movable portion 27. That is, the hinges 29, 29 are provided on the board on both end sides (both ends in a direction orthogonal to paper face of FIGS. 8A to 8D) of the movable portion 27, and there are provided a main first address electrode 35a1, a sub first address electrode 35a2, a main second address electrode 35b1, and a sub second address electrode 35b2 on left and right sides of the hinges 29, 29 by interposing the hinges 29, 29 at a center thereof. A displacement control signal (signal) Va1 is applied in the main first address electrode 35a1 and the movable portion 27, a vibration generating voltage (signal)

Va2 is applied between the sub first address electrode 35a2 and the movable portion 27. Further, a displacement control voltage (signal) Vb1 is applied between the main second address electrode 35b1 and the movable portion 27 and a vibration generating voltage (signal) Vb2 is applied between the sub second address electrode 35b2 and the movable portion 27.

Figure 8C:
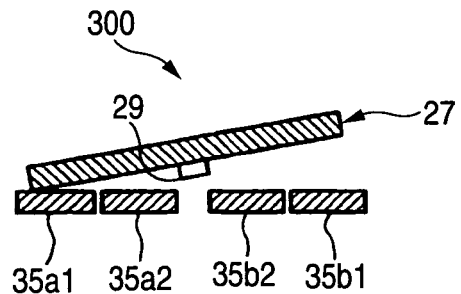
Figure 8D:
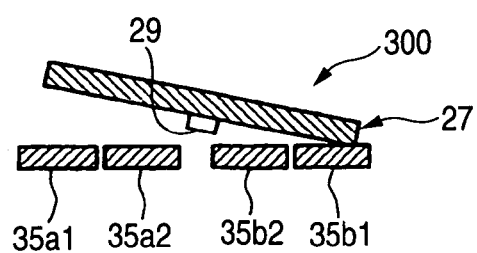

According to the small thin film movable element 300, in the movable portion 27 of a pivoting type constituting a rotational center by a center thereof, two or more of physical operating forces are applied to respective one sides of both sides interposing the rotational center. Thereby, by applying the displacement control voltage Va1 to the main first address electrode 35a1 while applying the vibration generating voltage Va2 to the sub first address electrode 35a2, the movable portion 27 is inclined to the left side as shown by FIG. 8C, and by applying the displacement control voltage Vb1 to the main second address electrode 35b1 while applying the vibration generating voltage Vb2 to the sub second address electrode 35b2, as shown by FIG. 8D, the movable portion 27 is inclined to the right side. Therefore, the vibration component Z is effectively utilized efficiently as the assisting force for displacing the movable portion 27 and the small thin film movable element 300 can be operated by a low voltage at high speed.

Next, a fourth embodiment of the small thin film movable element according to the invention will be explained.

Figure 9:
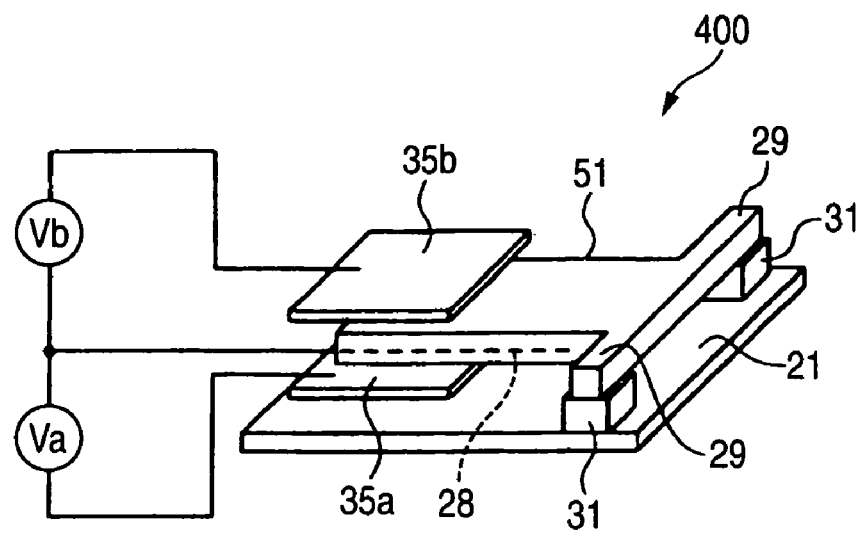
FIG. 9 is a conceptual view showing a fourth embodiment of a small thin film movable element according to the invention.

FIG. 9 is a conceptual view showing a fourth embodiment of a small thin film movable element according to the invention.

According to the small thin film movable element 400 according to the embodiment, one end of a movable portion 51 is supported by and fixed to the board 21 by way of the hinges 29, 29, the spacers 31, 31. That is, the movable portion 51 is constituted by a shape of a cantilever having a free end at other end thereof. Further, the first address electrode 35a is provided above the board 21 to be opposed to the free end of the movable portion 51, and the second address electrode 35b formed at an opposed board, not illustrated, is provided to a side opposed to the first address electrode 35a by interposing the movable portion 51 there between.

Also in the small thin film movable element 400 having such a constitution, by superposing the vibration generating signal on the voltage Va, Vb applied between the first address electrode 35a and the movable portion 51, or between the second address electrode 35b and the movable portion 51 and vibrating the movable portion 51 at least immediately before displacing the movable portion 51, the vibration component Z in the displacing direction is utilized as the inertia force for displacing the movable portion 51. Therefore, the electrostatic force operated in starting to displace the small thin film movable element 400 becomes small and is executed in a short period of time in comparison with the case of displacing the movable portion 51 from the stationary state. Further, by the vibration, the movable portion 51 moved in the direction of displacing the small thin film movable element 400 is started to displace and therefore, also an amount of displacing the movable portion 51 become small. Thereby, the movable portion 51 can be displaced by a low voltage at high speed.

Next, a fifth embodiment of a small thin film movable element according to the invention will be explained.

Figure 10:
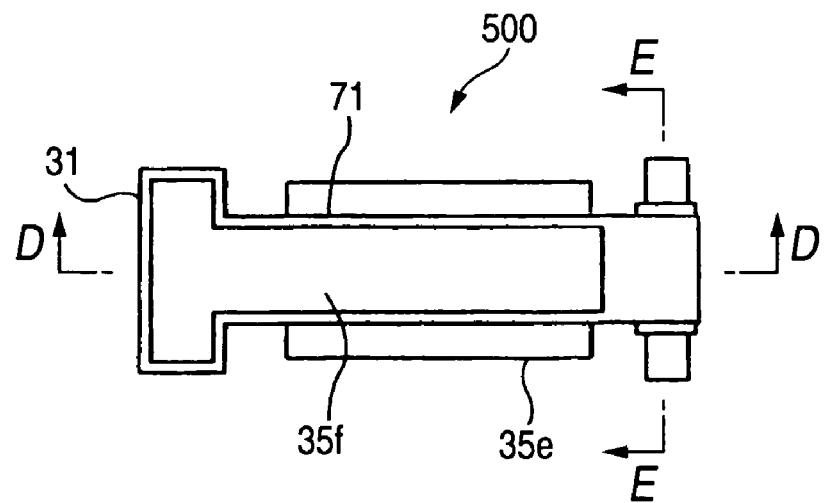
FIG. 10 is a plane view showing a fifth embodiment applying a small thin film movable element according to the invention to an RF switch.
Figure 11A:
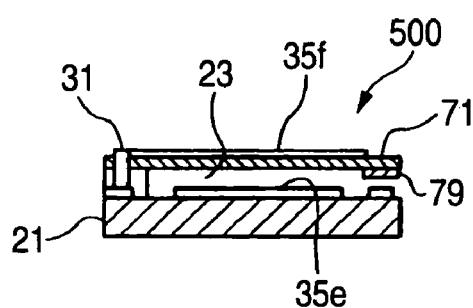
FIG. 11A illustrates an explanatory view showing a D-D section of an OFF state of the RF switch shown in FIG. 10.
Figure 11B:
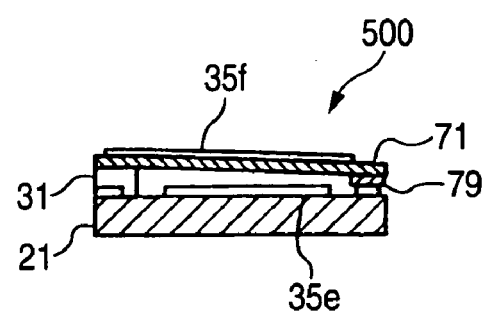
FIG. 11B illustrates an explanatory view showing a D-D section of an ON state of the RF switch shown in FIG. 10.
Figure 12A:
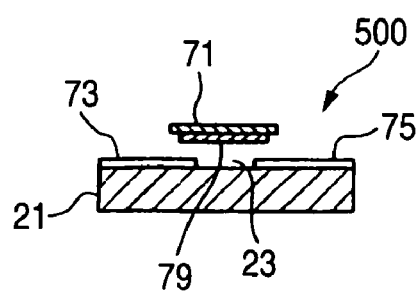
FIG. 12A illustrates an explanatory view showing an E-E section of the OFF state of the RF switch shown in FIG. 10.
Figure 12B:
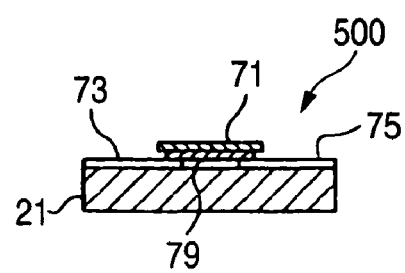
FIG. 12B illustrates an explanatory view showing an E-E section of the ON state of the RF switch shown in FIG. 10.

FIG. 10 is a plane view showing a fifth embodiment of applying a small thin film movable element according to the invention to an RF switch, FIG. 11A illustrates an explanatory view showing a D-D section in an OFF state of the RF switch shown in FIG. 10 and FIG. 11B illustrates an explanatory view showing a D-D section in an ON state thereof, FIG. 12A illustrates an explanatory view showing an E-E section in the OFF state of the RF switch shown in FIG. 10 and FIG. 12B illustrates an explanatory view showing an E-E section in the ON state thereof.

The small thin film according to the invention is applicable to an RF switch 500 which is not provided with a micromirror portion by a basic constitution thereof. The RF switch 500 constitutes an RF (radio frequency) switch of a cantilever type. That is, the RF switch 500 includes a cantilever 71 constituting a movable portion arranged in parallel with the board 21 by way of the gap 23, the spacer 31 supporting a base ends of the cantilever 71 by the board 21, a first electrode 35e and a second electrode 35f, an input terminal 73, an output terminal 75, and a shortcircuit contact 79.

By such a constitution, by applying a voltage between the first electrode 35e and the second electrode 35f, the cantilever 71 is elastically deformed by the electrostatic force in an up and down direction to realize the RF switch for connecting and switching an RF (high frequency) signal by opening and closing the input terminal 73 and the output terminal 75. The RF switch 500 is made to be able to switch, for example, signal paths of a low frequency and a high frequency in transmitting/receiving signals by a single switch. Further, a closed circuit can be formed by connecting contacts constituted by two of the input terminals 73, the output terminal 75 by using a single mechanical element. Thereby, both of a series connection mode of connecting signal paths and a shortcircuit mode of groundling the signal paths can be realized.

When the constitution of the small thin film movable element according to the invention is applied to a switch, a router, and an RF signal processing, a function more excellent than that in the case of using a normal electronic part can be realized. That is, the vibration of the movable portion can actively be reduced and therefore, a switch operation can be constituted by high speed. Further, transmission loss can be reduced and insulating performance in an OFF state can be promoted. When applied to an inductor or a capacitor, a tuning circuit having a Q value far higher than that in the case of being formed by using a normal semiconductor process can be realized. When a band pass filter or a phase shifter is constituted thereby, a function of a level higher than that of an SAW element which has not been realized can be achieved. When a variable capacitance capacitor is constituted thereby, a circuit having a tuning characteristic more near to ideal than a varactor diode can be realized. Further, insulating performance in an OFF state is as high as 40 dB or higher at normal, insertion loss in an ON state can be made to be one severalth of 1 dB, different from a diode, or an FET switch, a substantially ideal RF characteristic can be achieved.

Also according to the RF switch 500 constituted in this way, by superposing the vibration generating signal to the first electrode 35e and the second electrode 35f and vibrating the cantilever 71 at least immediately before displacing the RF switch 500, the vibration component Z in the direction of displacing the RF switch 500 can be utilized as the inertia force for displacing the cantilever 71. Therefore, the electrostatic force operated in starting to displace the cantilever 71 is reduced and is exerted in a short period of time in comparison with the case of displacing the cantilever 71 from the stationary state. Further, by the vibration, the cantilever 71 moved in the displacing direction is started to displace and therefore, an amount of displacing the cantilever 71 is reduced. Thereby, the cantilever 71 can be displaced by a low voltage at high speed.

Respectives of the small thin film movable elements 100, 200, 300, 400, 500 disclosed in the respective embodiments can constitute small thin film movable element arrays by being one-dimensionally or two-dimensionally aligned.

According to the small thin film movable element arrays, the small thin film movable elements 100, 200, 300, 400, 500 capable of executing a high speed switching operation are made to constitute arrays, can be driven by a low voltage at high speed and address voltages can be written faster than in the related art.

That is, high speed operation of the total of the array can be executed by operating the individual small thin film movable elements by necessary minimum electrostatic forces at high speed. Thereby, for example, exposure of a photosensitive member at high-speed and display by a projector having a larger number of pixels can be executed. Further, although, for example, according to an optical switch array for optical communication, high accuracy is requested and therefore, an operational error caused by a variation in individual elements needs to be corrected, according to the small thin film movable element array, the operational error can easily be corrected by changing voltages applied to the individual small thin film movable elements in correspondence with the correction.

Further, the high accuracy is requested for the small thin film movable element array for optical communication and therefore, the operational error caused by the variation in the individual elements needs to be connected. Therefore, in the small thin film movable element array, the correction needs to be carried out for respective elements. In contrast thereto, according to the small thin film movable element array according to the embodiment, the operational error can easily be corrected by changing the displacement control signals of the individual small thin film movable elements 100, 200, 300, 400, 500 in correspondence with the correction.

Figure 13:
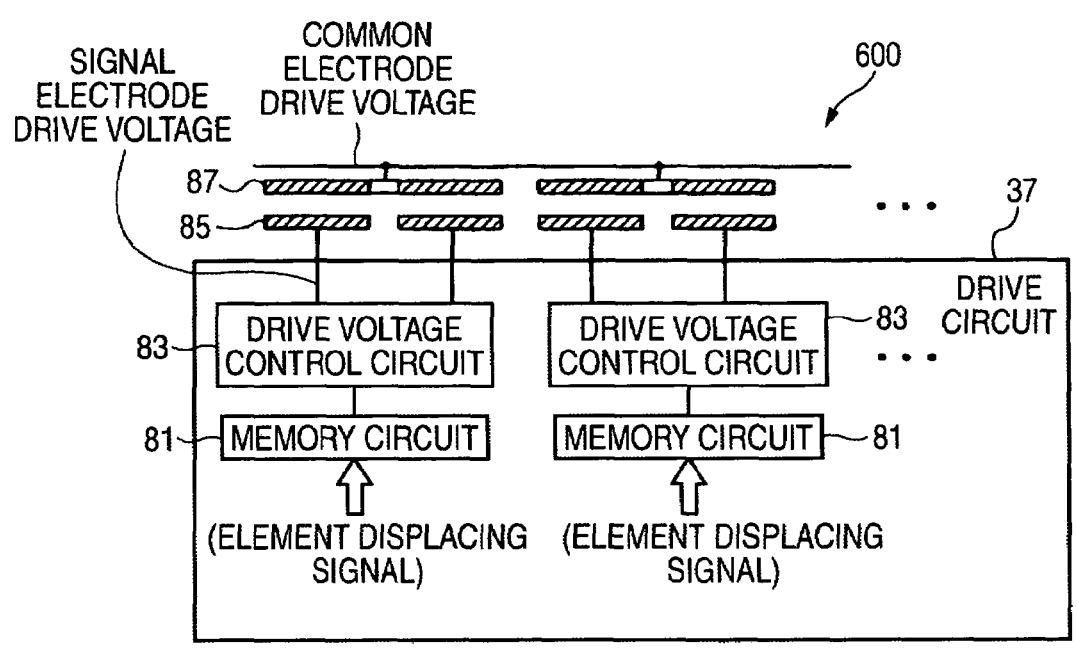
FIG. 13 is an explanatory views showing a constitution in which each of small thin film movable elements includes a drive circuit including a memory circuit.

FIG. 13 is an explanatory diagram showing a constitution in which each of small thin film movable elements includes a drive circuit including a memory circuit.

According to a small thin film movable element array 600, it is preferable that each of the small thin film movable elements 100 includes the drive circuit 37 (refer to FIGS. 1A and 1B) including a memory circuit 81. By providing the memory circuit 81, an element displacing signal can previously be written to the memory circuit 81. That is, the memory circuit 81 is previously written with the element displacing signal. In switching the small thin film movable element 100, by the element displacing signal stored to the memory circuit 81 of each of the small thin film movable elements 100 and a drive voltage control circuit 83 for controlling a voltage applied to the small thin film movable element 100, the displacement control signal, the vibration generating signal of the invention are outputted to a signal electrode (first address electrode, second address electrode) 85 of the small thin film movable element 100. At this occasion, a desired voltage is outputted also to a common electrode (movable electrode) 87.

In this way, when the small thin film movable element 100 is driven by using the memory circuit 81, each of the plurality of small thin film movable elements 100 can easily be operated by an arbitrary drive pattern and can be driven actively at higher speed. Further, although the constitution of the small thin film movable element array 100 of FIGS. 1A and 1B is shown here, the small thin film movable element array is not limited thereto but may be the small thin film movable element 200, 300, 400, 500 having other constitution.

Further, it is preferable that the small thin film movable element array 600 is provided with the control circuit 83 as a control portion for driving to switch each of the movable portions 27.

According to the small thin film movable element array 600 having the control circuit 83, by controlling to drive the movable portion 27 by the control circuit 83, before the movable portion 27 reaches a finally displaced position, an absolute value of a voltage between electrodes of the movable electrode (common electrode 87) and the fixed electrode (signal electrode 85) is reduced, or increased, or increased and reduced, and vibration or overshooting by impact produced by reaching the finally displaced position by the movable portion 27 can be restrained.

Figure 14:
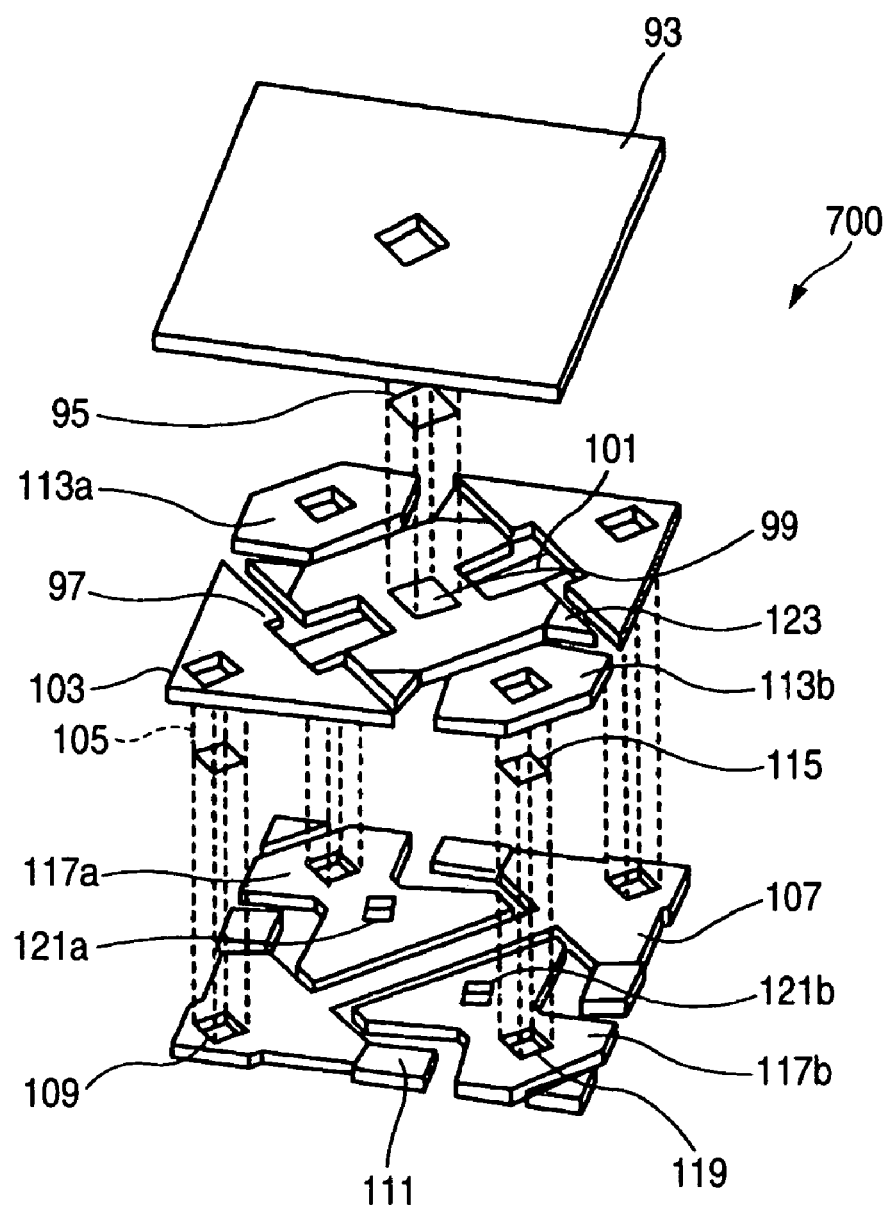
FIG. 14 is a disassembled perspective view of DMD constituted by using a small thin film movable element according to the invention.

FIG. 14 is a disassembled perspective view of DMD constituted by using the small thin film movable element according to the invention.

The small thin film movable element according to the invention is applicable to DMD 700 shown in FIG. 14. In the drawing, numeral 93 designates a micromirror which is connected to a support post connecting portion 99 of a yoke 97 by a micromirror support post 95. The yoke 97 is held by a hinge 101. Further, the hinge 101 is held by a post cap 103. The post cap 103 is connected to a hinge support post connecting portion 109 of a common bus 107 by a hinge support post 105. That is, the micromirror 93 is connected to the common bus 107 by way of the hinge 101, the post cap 103 and the hinge support post 105. The micromirror 93 is supplied with a common voltage by way of the common bus 107. The common bus 107 includes a grounding site 111 constituting a stopping member. The grounding site 111 is provided with insulating performance or maintained at a potential the same as that of the micromirror 93.

Notation 113a designates one fixed electrode (first address electrode) and notation 113b designates other fixed electrode (second address electrode). The first address electrode 113a is connected to an electrode support post connecting portion 119 of a first address electrode pad 117a by an electrode support post 115. Further, also the second address electrode 113b is connected to the electrode support post connecting portion 119 of a second address electrode pad 117b by the electrode support post 115.

A digital signal inputted from a first connecting portion 121a to the first address electrode pad 117a is inputted to the first address electrode 113a. A digital signal inputted from a second connecting portion 121b to the second address electrode pad 117b is inputted to the second address electrode 113b. By inputting the digital signals to the first address electrode 113a and the second address electrode 113b, the micromirror 93 is inclined to select white display or black display. By inclining the micromirror 93, a portion of a yoke piece 123 may be brought into contact with the grounding site 111.

Also according to DMD 700 having such a constitution, by superposing the vibration generating signal on a voltage applied between the first address electrode 113a and the yoke piece 123 or between the second address electrode 113b and the yoke piece 123, the yoke 97 is vibrated at least immediately before displacing the yoke 97, and the vibration component Z in the displacing direction is utilized as the inertia force for displacing the yoke 97. Therefore, the electrostatic force operated to start to displace the yoke 97 is reduced and is exerted in a short period of time in comparison with that in the case of displacing the yoke 97 from the stationary state. Further, by the vibration, the yoke 97 moved in the displacing direction is started to be displaced and therefore, also an amount of displacing the yoke 97 is reduced. Thereby, the yoke 97 can be displaced by a low voltage at high speed.

Figure 15:
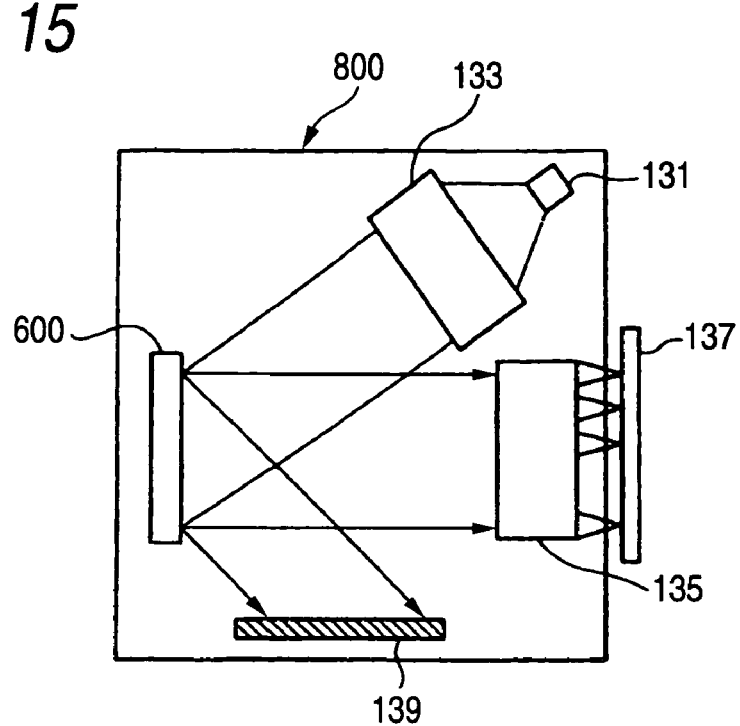
FIG. 15 is a view showing an outline constitution of an exposing apparatus constituted by using a small thin film movable element array according to the invention.

Next, an explanation will be given of an image forming apparatus constituted by using the small thin film movable element 100. Here, as an example of the image forming apparatus, first, an exposing apparatus 800 will be explained. FIG. 15 is a view showing an outline constitution of an exposing apparatus constituted by using the small thin film movable element array according to the invention. The exposing apparatus 800 includes an illuminating light source 131, an illuminating optical system 133, the small thin film movable element array 500 two-dimensionally aligned with a plurality of the small thin film movable elements 100 according to the above-described embodiment on the same plane and a projecting optical system 135.

The illuminating light source 131 is a light source of a laser, a high pressure mercury lamp, a short arc lamp or the like. The illuminating optical system 133 is constituted by, for example, a collimating lens for making light in a face-like shape emitted from the illuminating light source 131 parallel light. Parallel light transmitted through the collimating lens is orthogonally incident on the respective small thin film movable elements 100 of the small thin film movable element array 600. As means for constituting parallel light by light in the face-like shape emitted from the illuminating light source 131, other than the collimating lens, there is a method of arranging two of microlenses in series. Further, by using a short arc lamp or the like having a small light emitting point as the illuminating light source 131, the illuminating light source 131 may be regarded as a point light source and parallel light may be incident on the small thin film movable element array 600. Further, by using an LED array having LED in correspondence with each of the small thin film movable elements 100 of the small thin film movable element array 600 as the illuminating light source 131 and emitting light by making the LED array and the small thin film movable element array 600 proximate to each other, parallel light may be incident on each of the small thin film movable elements 100 of the small thin film movable element array 600. Further, when a laser is used as the illuminating light source 131, the illuminating optical system 133 may be omitted.

The projecting optical system 135 is for projecting light to a record medium 137 constituting an image forming face, and is, for example, a microlens array having microlenses in correspondence with the respective small thin film movable elements 100 of the small thin film movable element array 600 or the like.

Operation of the exposing apparatus 800 will be explained as follows.

Light in the face-like shape emitted from the illuminating light source 131 is incident on the illuminating optical system 133, and light made to be parallel light thereby is incident on the small thin film movable element array 600. Light incident on each of the small thin film movable elements 100 of the small thin film movable element array 500 is controlled to be reflected in accordance with the image signal. An image of light emitted from the small thin film movable element array 600 is taken to be exposed on the image forming face of the record medium 137 by the projecting optical system 135. Image taking light is projected to be exposed while being moved in a scanning direction relative to the record medium 137 and can expose a wide area by high resolution. In this way, by providing the collimating lens on a side of the incident face of light of the small thin film movable element array 600, light incident on a plane board of respective modulating elements can be constituted by parallel light. Further, numeral 139 in the drawing designates an optical absorber for introducing OFF light.

The exposing apparatus 800 is not limited to using the collimating lens as the illuminating optical system 133 but can be constituted by using a microlens array. In this case, the respective microlenses of the microlens array correspond to the respective small thin film movable elements 100 of the small thin film movable element array 600 and designed and adjusted such that optical axes and focal faces of the microlenses are aligned to centers of the respective optical modulating elements.

In this case, incident light from the illuminating light source 131 is converged to a region having an area smaller than one element of the small thin film movable element 100 and is incident on the small thin film movable element array 600 by the microlens array. Light incident on each of the small thin film movable elements 100 of the small thin film movable element array 600 is controlled to be reflected in accordance with the inputted image signal. Light emitted from the small thin film movable element array 600 is projected to be exposed to the image forming face of the record medium 137 by the projecting optical system 135. Projected light is projected to be exposed while being moved in the scanning direction relative to the record medium 137 and can expose a wide area by high resolution. In this way, light from the illuminating light source 131 can be converged by the microlens array and therefore, the exposing apparatus promoting light utilizing efficiency can be realized.

Further, a shape of a lens face of the microlens is not particularly limited and may be a spherical face, a semispherical face or the like and may be a projected curved face or a recessed curved face. Further, the microlens array may be a microlens array having a flat shape having a refractive index distribution and may be arrayed with a Fresnel lens or a diffractive type lens by binary optics or the like. A material of the microlens is constituted by, for example, transparent glass or resin. From a view point of mass production performance, resin is excellent, from a view point of service life, reliability, glass is excellent. From an optical view point, quartz glass, melted silica, alkaliless glass or the like is preferable as glass, acrylic species, epoxy species, polyester species, polycarbonate species, styrene species, vinyl chloride species or the like is preferable as resin. Further, as resin, there is a photocurrying type, a thermoplastic type or the like, which is preferably selected pertinently in accordance with a method of fabricating a microlens.

Next, a projecting apparatus will be explained as other example of the image forming apparatus.

Figure 16:
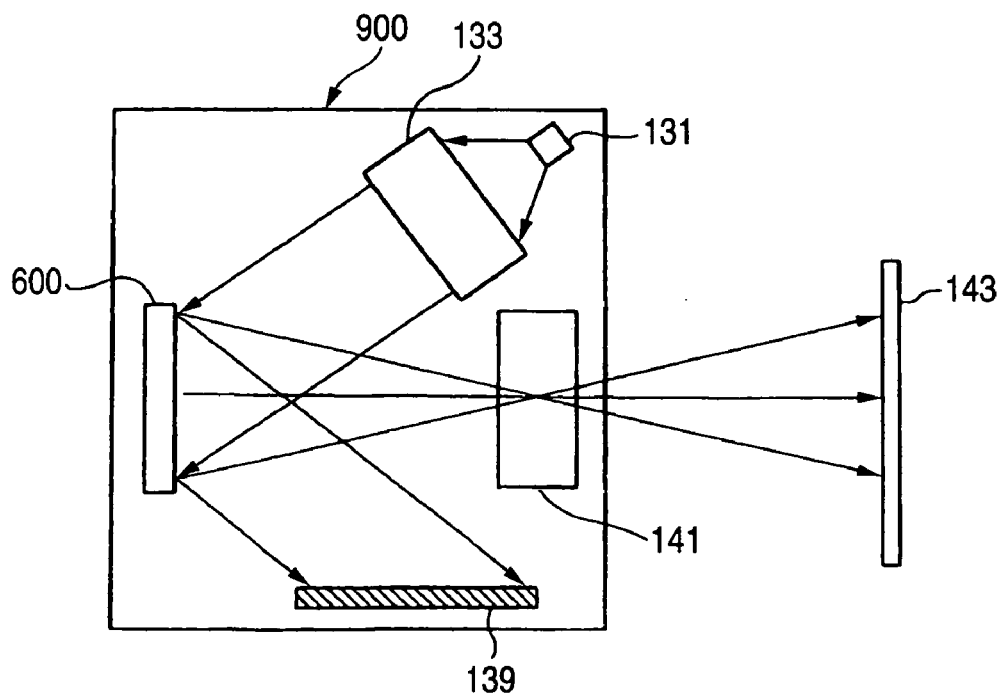
FIG. 16 is a view showing an outline constitution of a projecting apparatus constituted by using a small thin film movable element array according to the invention.

FIG. 16 is a view showing an outline constitution of a projecting apparatus constituted by using the small thin film movable element array according to the invention. Constitutions similar to those of FIG. 15 are attached with the same notations and an explanation thereof will be omitted.

A projector 900 as a projecting apparatus includes the illuminating light source 131, the illuminating optical system 133, the small thin film movable element array 600, and a projecting optical system 141. The projecting optical system 141 is an optical system for a projecting apparatus for projecting light to a screen 143 constituting the image forming face. The illuminating optical system 133 may be the collimator lens, or may be a microlens array.

Next, operation of the projector 900 will be explained.

Incident light from the illuminating light source 131 is converged to a region having an area smaller than that of one element of the small thin film movable element 100 by, for example, a microlens array and is incident on the small thin film movable element array 600. Light incident on each of the small thin film movable elements 100 of the small thin film movable element array 600 is controlled to be reflected in accordance with the image signal. Light emitted from the small thin film movable element array 600 is projected to be exposed to the image forming face of the screen 143 of the projecting optical system 141. In this way, the small thin film movable element array 600 can be utilized for the projecting apparatus and is applicable also to a display apparatus.

Therefore, according to the image forming apparatus of the exposing apparatus 800, the projector 900 or the like, by providing the small thin film movable element array 600 to an essential portion of the constitution, the movable portion 27 can be displaced by a low voltage at high speed. Thereby, exposure of a photosensitive member at high speed and display of a projector having a larger number of pixels can be carried out. Further, according to the image forming apparatus (exposing apparatus 800) controlling a gray scale by ON/OFF of exposing light, by enabling to shorten a time period of ON/OFF, a higher gray scale can be realized. As a result, a photosensitive member can be exposed at high speed and the projector having a larger number of pixels can be displayed.

Figure 17:
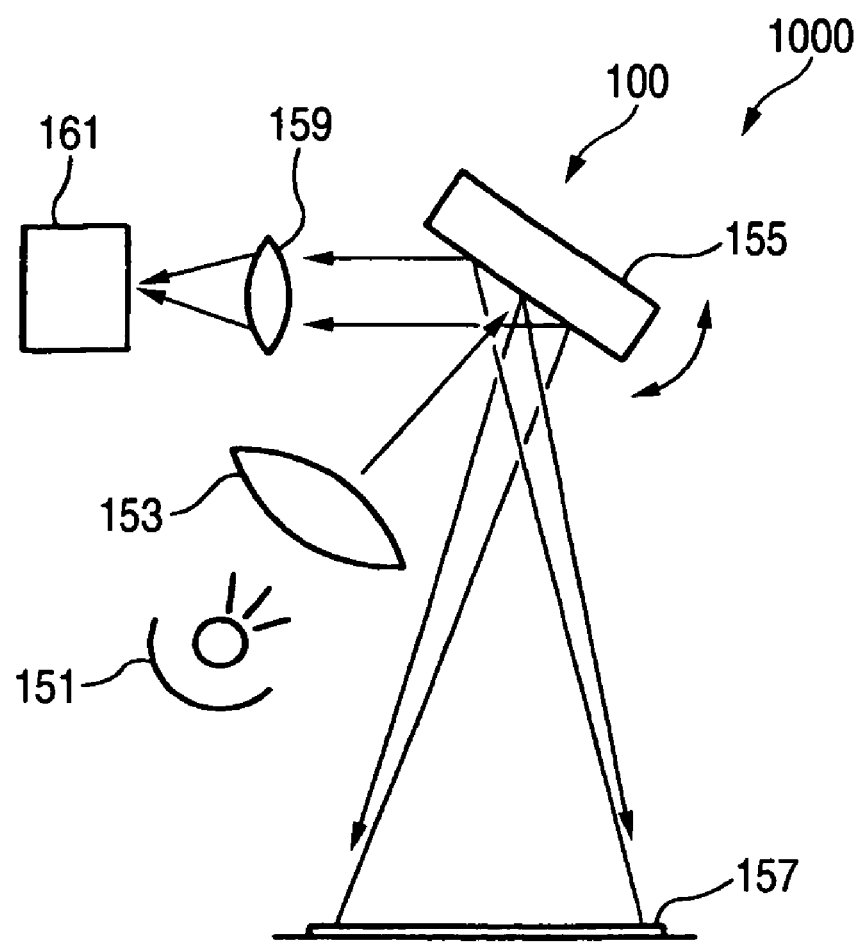
FIG. 17 is a view showing an outline constitution of a scanner constituted by using a small thin film movable element array according to the invention.

FIG. 17 is a view showing an outline constitution of a scanner constituted by using the small thin film movable element array according to the invention.

The small thin film movable element array according to the invention can preferably be used for a beam scanner or the like for scanning light ray emitted from a light emitting element to an irradiated object and reflecting light returned from the irradiated object to be incident on a light receiving element. A scanner 1000 narrows light from a light source 151 by a lens 153, reflects the light by a scan mirror 155 constituting the movable portion of the small thin film movable element 100 to irradiate to a bar code 157. The scan mirror 155 is pivoted in order to irradiate light over an entire region of the bar code 157. In pivoting, the movable portion is pivoted to displace by constituting a center of twist by a hinge by applying voltages to a first electrode, a second electrode, a movable portion, not illustrated. That is, by constituting the movable portion by the scan mirror 155, a direction of reflecting light is switched.

On the other hand, light irradiated to a face of the bar code 157 is returned again to the scan mirror 155 while being reflected randomly with a change in a light amount by black and white of the bar code, light reflected thereby is converged by a converging lens 159 and a change in the light amount is electrically converted to be outputted by a light receiving element 161. Further, in order to promote accuracy of reading, a band pass filter (BPF) is provided at a front face of the light receiving element 161 to prevent unnecessary light other than light of emitted light frequency from being adopted.

Also in the scanner 1000 using the small thin film movable element 100, by vibrating the scan mirror 155 at least immediately before displacing the scan mirror 155, the vibration component Z in the displacing direction is utilized as the inertia force for displacing the scan mirror 155. As a result, the scan mirror 155 can be displaced by a low voltage at high speed.

Figure 18:
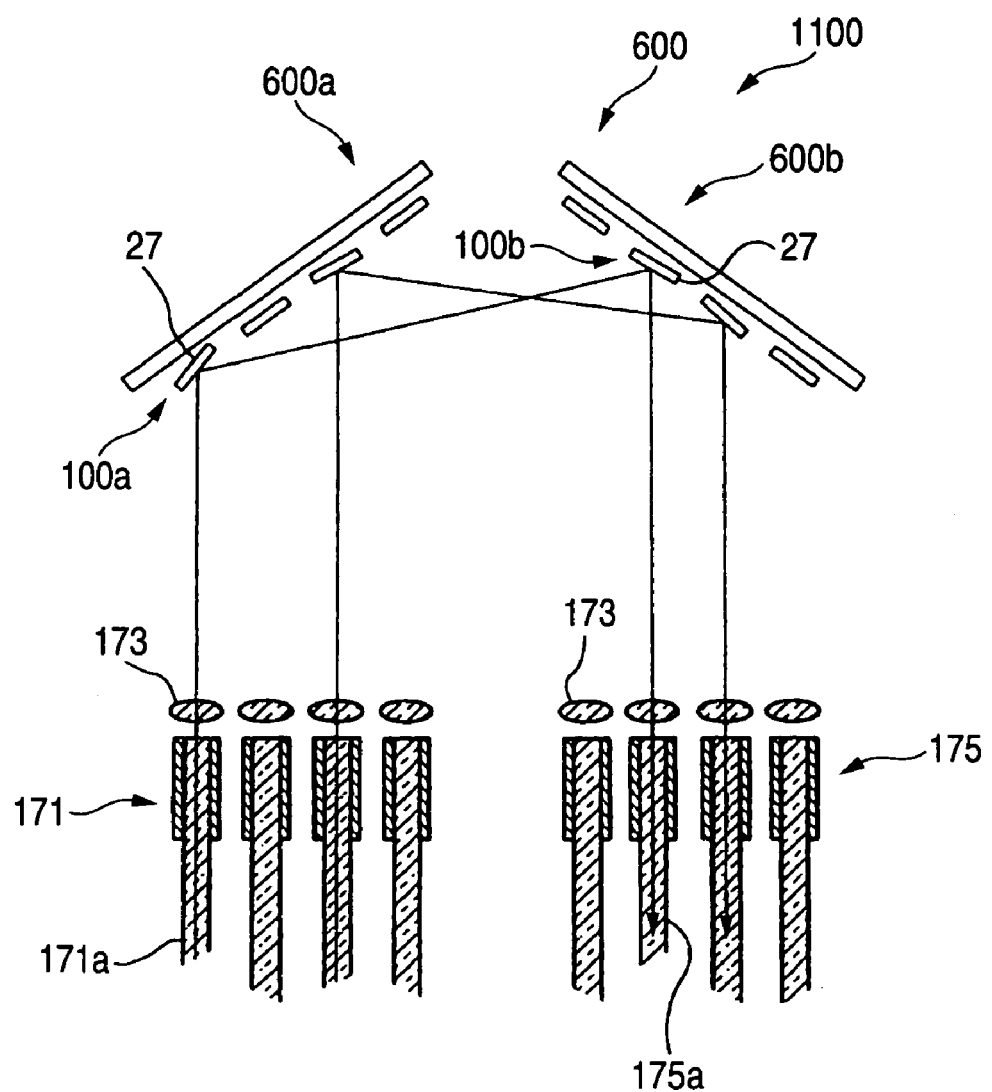
FIG. 18 is an explanatory view showing a constitution of a cross connect switch using a small thin film movable element.
Figure 19A:
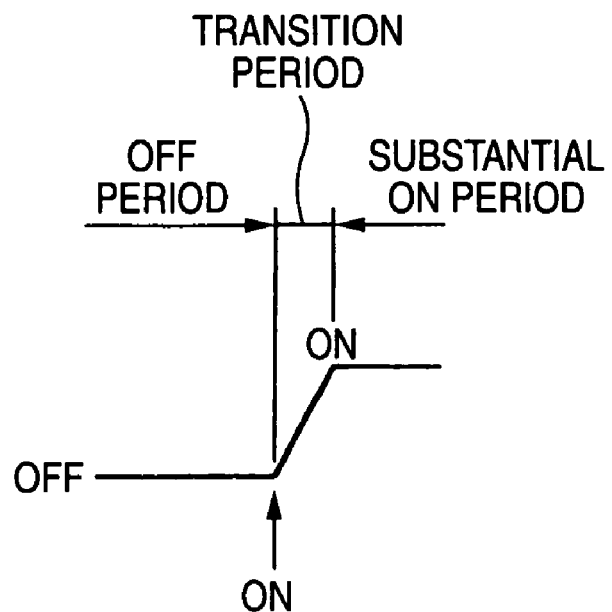
FIGS. 19A and 19B illustrates explanatory views of operation of a movable element of a small thin film movable element of the related art.
Figure 19B:
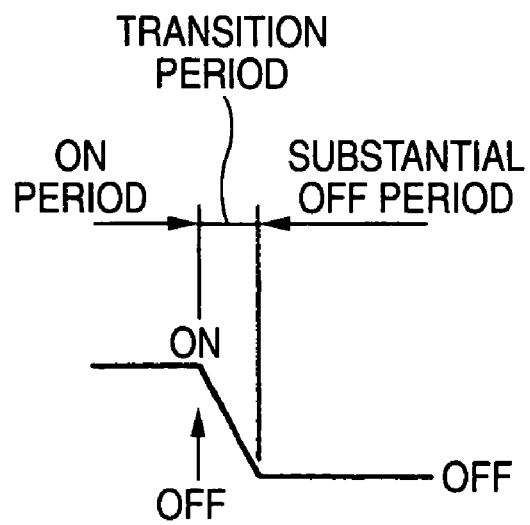

FIG. 18 is an explanatory view showing a constitution of a cross connect switch using a small thin film movable element.

Further, the small thin film movable element array according to the invention can preferably be used for a cross connect switch of optical communication or the like.

The cross connect switch 1100 can be constituted by using, for example, the small thin film movable element array 600 one-dimensionally aligned with the small thin film movable elements 100. In an illustrated example, two of small thin film movable element arrays 600a, 600b are provided. According to the cross connect switch 1100, light emitted from an optical fiber 171a of an input fiber port 171 passes a microlens 173 to be incident on a predetermined small thin film movable element 100a of the small thin film movable element array 600a on one side. Incident light constitutes a reflected light by operating to switch the small thin film movable element 100a to be incident on a desired small thin film movable element 100b of an incident side of the small thin film movable element array 600b. Incident light is incident on an optical fiber 175a of a predetermined output fiber port 175 by switching the small thin film movable element 100b.

Also according to the cross connect switch 1100, by using the small thin film movable element array 600 comprising a plurality of the small thin film movable elements 100, the movable portion 27 can be displaced by a low voltage at high speed. As a result, noise is reduced by reducing chattering and switching operation can be constituted by high speed.

Further, according to the cross connect switch 1100, the operational error can easily be corrected by changing voltages applied to the individual small thin film movable elements 100 as described above and therefore, the operational error caused by the variation in the individual small thin film movable elements 100 can simply be corrected and high accuracy switching can be carried out.

Further, although according to the cross connect switch 1100, an explanation has been given by an example of using the small thin film movable element 100 which is pivoted monoaxially, the three-dimensional small thin film movable element 100A which is biaxially pivoted as shown in FIG. 4 may be used for the small thin film movable element array. By constituting in this way, for example, even in a case in which the optical fibers 171a of the input fiber ports 171 are one-dimensionally aligned and the optical fibers 175a of the output fiber ports 175 are two-dimensionally aligned, by three-dimensionally driving the movable portion 27, light emitted from the optical fiber 171a can be switched to the desired optical fiber 175a in a direction orthogonal to paper face.

According to the small thin film movable element according to the invention, in the small thin film movable element including the movable portion and the fixed electrode for displacing the movable portion by the electrostatic force in accordance with the voltage applied to the movable electrode and the fixed electrode, the movable portion is vibrated at least immediately before the displacement and therefore, the vibration component in the displacing direction is utilized as the inertia force, the electrostatic force operated to start the displacement becomes small and is applied in a short period of time in comparison with the case of displacing the movable portion from the stationary state, further, also the amount of displacing the movable portion becomes small. Thereby, the movable portion can be displaced by a low voltage and at high speed. As a result, the difference between the timings when the movable portion is made OFF from ON and when the movable portion is made ON from OFF can be reduced and a speed and an accuracy of various application operations utilizing the displacement of the movable portion can be promoted.

According to the small thin film movable element array according to the invention, the small thin film movable element according to any one of claim 1 through claim 8 is one-dimensionally or two-dimensionally aligned and therefore, the individual small thin film movable elements are operated by the necessary minimum electrostatic force and at high speed and the total of the array can be operated at high speed. Thereby, although high accuracy is requested for an optical switch array for optical communication and therefore, an operational error caused by a variation in the individual elements needs to be corrected, according to the small thin film movable element array, by changing the displacement control signals of the individual small thin film movable elements in correspondence with the correction, the operational error can easily be corrected.

According to the method of driving a small thin film movable element according to the invention, the movable portion is vibrated by the resonance frequency, the vibration generating signal for generating the vibration is intermittently applied and therefore, in comparison with the case of always applying the vibration generating signal, the movable portion can be continued to vibrate by a small electric amount.

The entire disclosure of each and every foreign patent application from which the benefit of foreign priority has been claimed in the present application is incorporated herein by reference, as if fully set forth.

What is claimed is:

1. A small thin film movable element comprising:
   a movable portion supported elastically deformably and having a movable electrode at least a portion of the movable portion; and
   a fixed electrode arranged to be opposed to the movable portion,
   wherein the movable portion is displaced by an electrostatic force in accordance with a voltage applied to the movable electrode and the fixed electrode, and
   wherein the movable portion comprises a vibration applying unit that applies a vibration to the movable portion at least immediately before a displacing operation of the movable portion.

2. The small thin film movable element according to claim 1,
   wherein the vibration applying unit applies a displacement control signal for displacing the movable portion to the fixed electrode between the movable electrode and the fixed electrode when the movable portion is moved to the fixed electrode by the vibration.

3. The small thin film movable element according to claim 2, wherein the displacement control signal is applied when a distance between the movable portion and the fixed electrode becomes the shortest.

4. The small thin film movable element according to claim 1, further comprising a board to which the fixed electrode is provided,
   wherein the movable electrode is provided to the movable portion of a thin film shape, the movable portion being supported by the board to be spaced apart from each other by a gap there between, and
   the movable portion is moved to be proximate to and remote from the board substantially in parallel with the board.

5. The small thin film movable element according to claim 1, further comprising a board to which the fixed electrode is provided,
   wherein the movable electrode is provided to the movable portion of a thin film shape, the movable portion being supported by the board to be spaced apart from each other by a gap there between and supported by the board by way of a support portion, and
   the movable portion is pivoted centering on the support portion.

6. The small thin film movable element according to claim 1, wherein the movable portion further comprises a reflecting face, and
   light incident on the reflecting face of the movable portion is modulated.

7. The small thin film movable element according to claim 1, further comprising a board to which the fixed electrode is provided, the board comprising an input terminal and an output terminal,
   wherein the movable portion further comprises a shortcircuit contact, and
   the shortcircuit contact of the movable portion opens and closes the input terminal and the output terminal to connect and switch a high frequency signal.

8. The small thin film movable element according to claim 1,
   wherein the vibration applied to the movable portion by the vibration applying unit is a vibration having a resonance frequency.

9. A method of driving the small thin film movable element according to claim 8, the method comprising
   intermittently applying to the movable portion a vibration generating signal for generating the vibration having the resonance frequency.

10. A small thin film movable element array comprising small thin film movable elements which are one-dimensionally or two-dimensionally aligned, each of the small thin film movable elements being according to the small thin film movable element according to claim 1.

11. A small thin film movable element comprising:
   a movable portion supported elastically deformably and having a movable electrode at least a portion of the movable portion; and
   a fixed electrode arranged to be opposed to the movable portion,
     wherein the movable portion is displaced by an electrostatic force in accordance with a voltage applied to the movable electrode and the fixed electrode, and
     wherein the movable portion comprises means for vibrating the movable portion at least immediately before a displacing operation of the movable portion.

* * * * *